US007385969B2

(12) United States Patent
Tang et al.

(10) Patent No.: US 7,385,969 B2
(45) Date of Patent: Jun. 10, 2008

(54) CROSS-POINT SWITCH FABRIC AND SWITCH FABRIC SLICE

(75) Inventors: Benjamim Tang, Rancho Palos Verdes, CA (US); Keith N. Bassett, Redondo Beach, CA (US)

(73) Assignee: Northrop Grumman Space & Mission Systems Corp., Los Angeles, CA (US)

( * ) Notice: Subject to any disclaimer, the term of this patent is extended or adjusted under 35 U.S.C. 154(b) by 1207 days.

(21) Appl. No.: 10/278,501

(22) Filed: Oct. 23, 2002

(65) Prior Publication Data

US 2004/0081182 A1 Apr. 29, 2004

(51) Int. Cl.
*H04Q 11/00* (2006.01)
(52) U.S. Cl. ........................ 370/388; 370/386
(58) Field of Classification Search ............... 370/388, 370/537
See application file for complete search history.

(56) References Cited

U.S. PATENT DOCUMENTS

| 4,394,541 | A | | 7/1983 | Seiden |
| 4,660,178 | A | * | 4/1987 | Hardee et al. ......... 365/230.06 |
| 4,821,034 | A | | 4/1989 | Anderson et al. |
| 4,849,751 | A | * | 7/1989 | Barber et al. .......... 340/825.02 |
| 5,170,160 | A | * | 12/1992 | Cooperman et al. ... 340/825.01 |
| 5,285,202 | A | * | 2/1994 | Cooperman et al. ... 340/825.01 |
| 6,661,308 | B2 | * | 12/2003 | Malcolm ................. 333/101 |
| 6,784,932 | B1 | * | 8/2004 | Okamoto ................ 348/302 |
| 6,907,041 | B1 | * | 6/2005 | Turner et al. ............ 370/412 |

OTHER PUBLICATIONS

Metzger, et al., "A 10Gb/s 12=12 Cross-Point Switch Implemented with AlGaAs/GaAs Heterojunction Bipolar Transistors," IEEE, p. 109-112, (Sep. 25, 1997).
Lowe, "Bufferless Broadcasting: A Low Power Distributed Circuit Technique for Broadcasting 10-Gb/s Chip Input Signals," IEEE Journal of Solid-State Circuits, p. 1551-1555, (Oct. 25, 1997).
Lowe, "A GaAs HBT 16=16 10-Gb/s Channel Crosspoint Switch," IEEE Journal of Solid-State Circuits, vol. 32 (No. 8), p. 1263-1268, ( Aug. 25, 1997).
European Search Report issued from European Patent Office issued on Oct. 27, 2005 for the corresponding European patent application No. 03023900.8 (a copy thereof).

\* cited by examiner

*Primary Examiner*—Chi Pham
*Assistant Examiner*—Phuc Tran
(74) *Attorney, Agent, or Firm*—Posz Law Group, PLC.

(57) ABSTRACT

A cross-point switch fabric slice (100) includes multistage gated buffer tree (135) incorporating at least first and second serially connected gated buffer stages (136, 138). N inputs (102-116) connect to preselected gated buffers (146-160) in the first gated buffer stage (136). The multistage gated buffer tree provides a signal path from any of the N inputs (102-116) to at least one switch output (118) in response to gated buffer stage control signals for the first gated buffer stage (136) and gated buffer stage control signals for the second gated buffer stage (138). Generally, the number of gated buffers decreases from that of the previous stage. As an input signal propagates through the cross-point switch fabric slice (100), longer internal connections are driven by more capable buffers.

33 Claims, 8 Drawing Sheets

CROSS-POINT SWITCH FABRIC AND SWITCH FABRIC SLICE

BACKGROUND OF THE INVENTION

Cross-point switches are critical elements in modern communication networks. In general, a cross-point switch allows a signal present at any of N input ports to be redirected to any of M output ports. As a result, a cross-point switch provides a sophisticated routing function underlying data flow through advanced communication networks.

The performance of a cross-point switch, however, is limited by the signal quality present on the cross-point switch inputs and the effect of the cross-point switch itself on the signal as the signal traverses the switch. In particular, the design and construction of prior cross-point switches placed certain limits on the data rate of signals that could reliably traverse the core switch fabric in the cross-point switch. Thus, for example, the parasitic effects of buffers, multiplexers, and signal traces inside the switch were often data rate limiting factors, particularly with input signals already attenuated by transmission through long coaxial input connections to the cross-point switch.

However, driven in part by established optical networking technologies, data rates and signal frequency are ever increasing. Networks that can meet the potentially available data rates will benefit through increased throughput and, ultimately, increased revenue. However, as noted above, past cross-point switches were unduly limited in the data rate of signals that could traverse the cross-point switch.

A need has long existed in the industry for a cross-point switch that addresses the problems noted above and others previously experienced.

BRIEF SUMMARY OF THE INVENTION

A preferred embodiment of the present invention provides a cross-point switch fabric slice. The cross-point switch fabric slice includes a multistage gated buffer tree incorporating at least first and second serially connected gated buffer stages. N inputs connect to preselected gated buffers in the first gated buffer stage. The multistage gated buffer tree provides a signal path from any of the N inputs to at least one switch output in response to gated buffer stage control signals for each gated buffer stage.

The multistage gated buffer tree may include additional serially connected gated buffer stages (e.g., first, second, and third serially connected gated buffer stages) depending on the size of the switch fabric that will be built from the cross-point switch fabric slices. In general, the number of gated buffers in each subsequent gated buffer stage decreases from that of the previous stage. In turn, the size of each buffer may increase to provide additional current drive capability. Thus, as an input signal propagates through the cross-point switch fabric slice, longer internal connections are driven by more capable buffers.

The cross-point switch fabric slice may employ multi-stage decoding. To that end, each gated buffer stage may be individually controlled by one or more gated buffer control signals to activate a desired signal path from an input to an output. The gated buffer control signals may further be shared between gated buffers in a single stage. Thus, for example, the first gated buffer stage may be partitioned into a first substage and a second substage that share certain gated buffer stage control signals. As a result, corresponding gated buffers in each substage may be simultaneously activated, with additional selection performed in one or more subsequent gated buffer stages.

Another preferred embodiment of the present invention provides a method for routing a signal through a cross-point switch fabric. The method includes applying a signal on one of N inputs, activating a signal path through a first multistage gated buffer tree comprising at least first and second serially connected gated buffer stages, and outputting the signal on a switch output coupled to the multistage gated buffer tree.

The N×M cross-point switch fabric is formed from multiple cross-point switch fabric slices. Thus, generally, the method activates a signal path through one of many multistage gated buffer trees that form the cross-point switch fabric. As noted above, multistage decoding may be employed to individually control each gated buffer stage or substage.

DETAILED DESCRIPTION OF THE INVENTION

Figure 1:
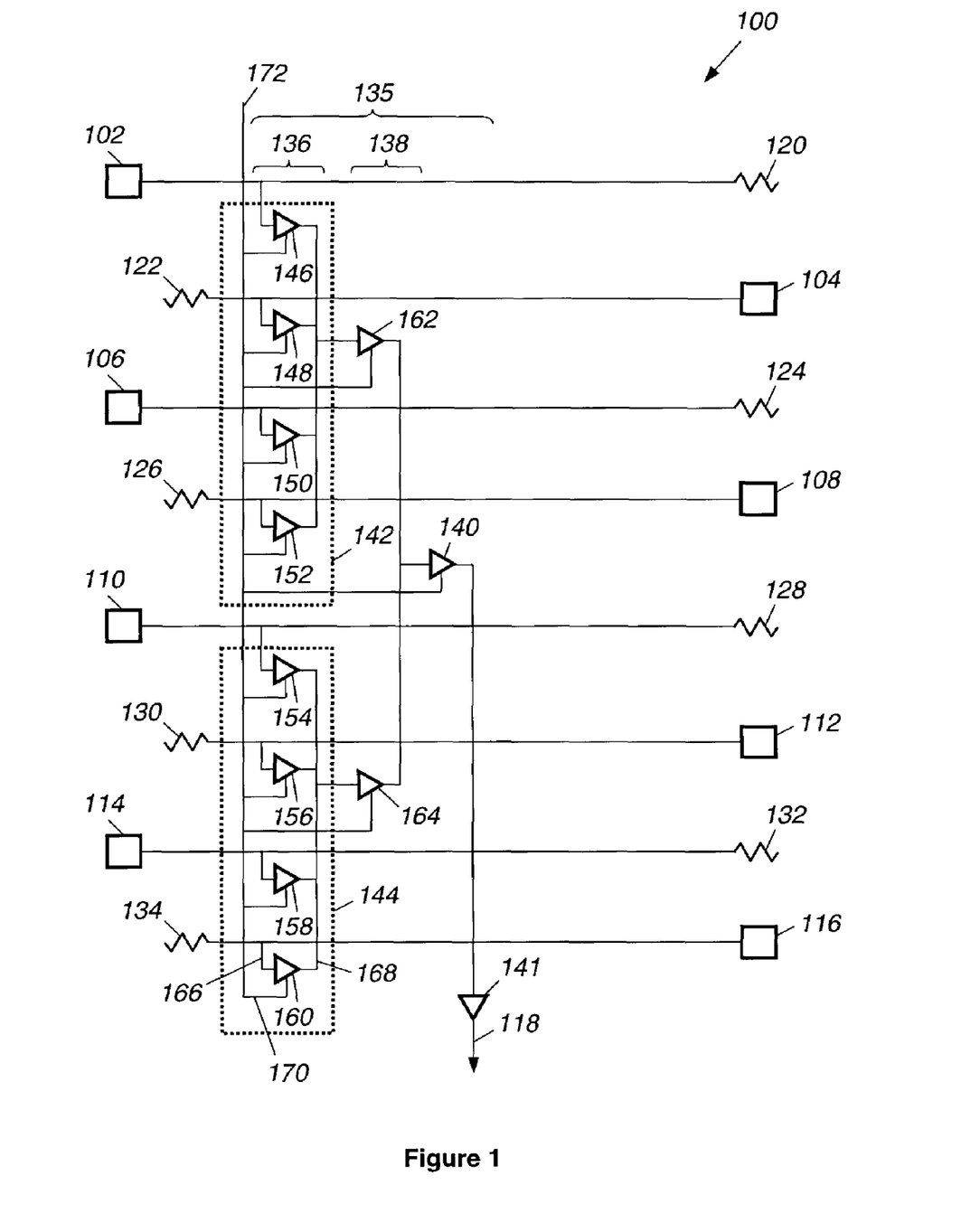
FIG. 1 illustrates a cross-point switch fabric slice.

With reference to FIG. 1, a cross-point switch fabric slice 100 includes eight switch inputs 102, 104, 106, 108, 110, 112, 114, and 116 and a switch output 118. The inputs 102-116 are shown terminated in impedance matching resistances 120, 122, 124, 126, 128, 130, 132, and 134. Although the impedance matching resistances 120-134 are not required for operation of the switch fabric slice 100, they are preferably included when switch fabric slices are connected together to form switch fabrics.

The switch fabric slice 100 is formed as a multistage gated buffer tree 135 that includes a first gated buffer stage 136, a second gated buffer stage 138, and a third gated buffer stage 140. An output buffer 141 that maps internal signal levels to external signal levels is also provided.

The first gated buffer stage 136 is formed from a first substage 142 and a second substage 144. The first substage 142 includes the gated buffers 146, 148, 150, and 152. The second substage includes the gated buffers 154, 156, 158, and 160. The second gated buffer stage 138 is formed from the gated buffer 162 connected to the first substage 142, and the gated buffer 164 connected to the second substage 144.

Each gated buffer includes a signal input, a signal output, and control inputs. For example, the gated buffer 160 is shown in FIG. 1 with the signal input 166, signal output 168, and the control inputs 170. Each of the control inputs may be driven, as explained in more detail below, by gated buffer stage control signals provided, for example, by the control bus 172. The control bus 172 may be driven by an address decoder, for example, to assert the gated buffer control signals that activate a signal path through one or more cross-point switch fabric slices.

The gated buffer control signals generally implement a multistage decoding process for the cross-point switch fabric slice 100. For example, in FIG. 1, control signals may be shared between the first stage 142 and the second stage 144. Thus, selecting the second gated buffer 148 (connected to switch input 104) in the first stage 142 also selects the corresponding gated buffer 156 (connected to switch input 112) in the second stage 144. However, another control signal may then provide a final selection of the switch inputs 104, 112 through one of the two gated buffers, 162 and 164. The output buffer 141 then drives the input signal present on the selected switch input onto the switch output 118.

Note that the number of gated buffers in subsequent gated buffer stages decreases. Because there are fewer gated buffers in each subsequent stage, there is typically more chip real estate available for gated buffers in each subsequent stage. As a result, the gated buffers in a particular stage may be increased in size to provide greater drive capability than gated buffers in a previous stage. Thus, if interconnection lines lengthen in subsequent stages, the gated buffers can be designed to drive those interconnection lines. In general, the additional chip real estate allows the gated buffers to be performance matched to many diverse criteria, including drive capability, as noted above.

Note that the first gated buffer stage 136 is serially connected to the second gated buffer stage 138. In other words, the second gated buffer stage 138 provides a narrowing selection of one or more buffers active after the first gated buffer stage 136. The switch fabric slice 100 provides an 8-to-1 selection function in that any of 8 inputs may be connected to the switch output 118. The output buffer 141 provides the drive capability to drive the load expected on the switch output 118.

Figure 2:
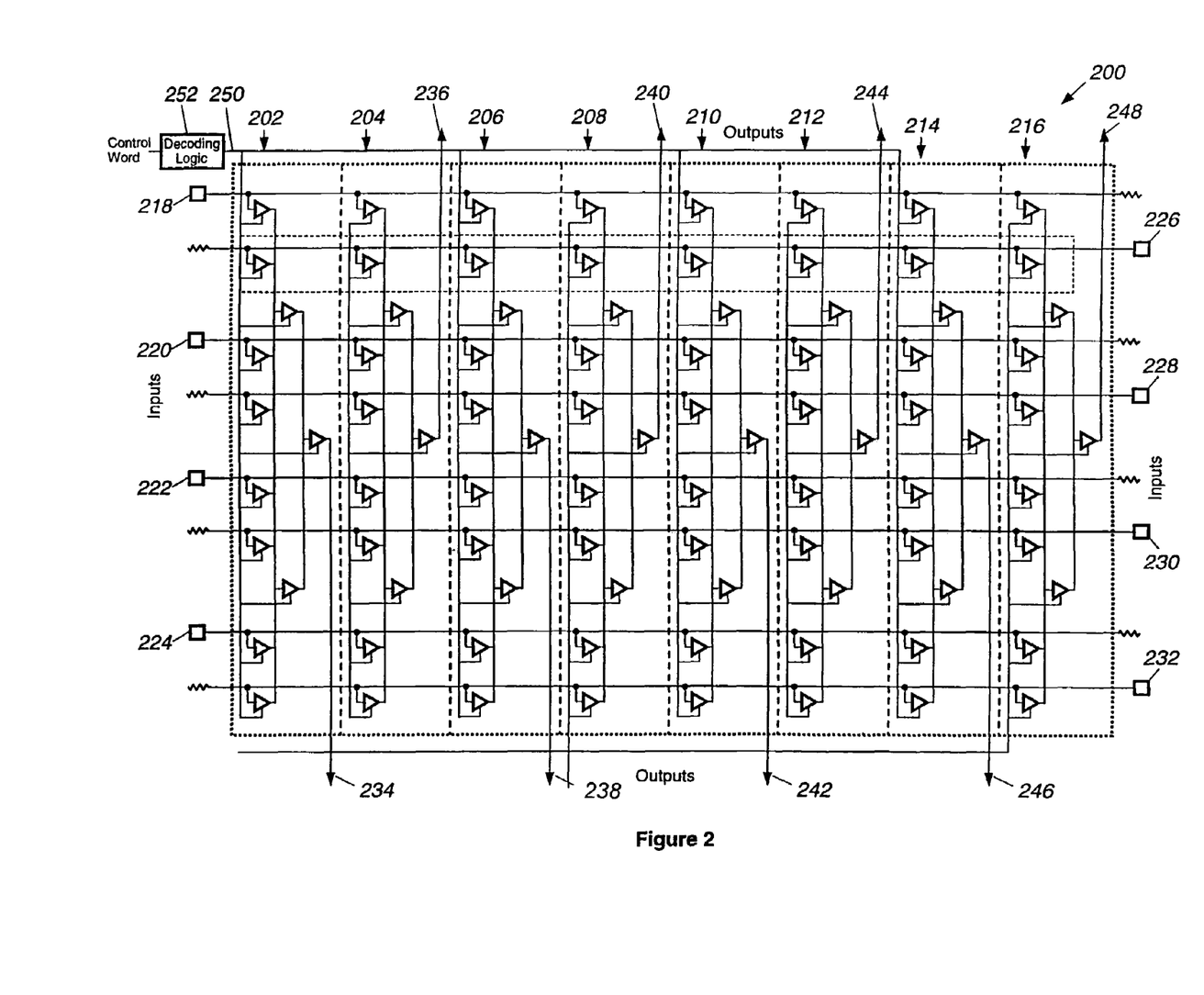
FIG. 2 shows an 8×8 cross-point switch fabric built using cross-point switch fabric slices.

Turning next to FIG. 2, that figure shows a 8×8 cross-point switch fabric 200 implemented with cross-point switch fabric slices 202, 204, 206, 208, 210, 212, 214, and 216. The inputs are labeled as switch inputs 218, 220, 222, 224, 226, 228, 230, and 232, while the outputs are labeled as switch outputs 234, 236, 238, 240, 242, 244, 246, and 248. A control bus 250 provides the gated buffer stage control signals that activate a signal path through the gated buffer trees in each cross-point switch fabric slice 202-216 to connect a switch input to a switch output.

The decoding logic 252 accepts, for example, a multi-bit control word identifying a desired switch input to switch output connection. The decoding logic 252 outputs gated buffer stage control signals to activate a signal path through the cross-point switch fabric 200 from a switch input to a switch output.

Note that, in general, each cross-point switch fabric slice 202-216 connects through its first gated buffer stage to each of the switch inputs 218-232. The characteristics of a cross-point switch fabric slice 100 noted above may be incorporated into one or more of the cross-point switch fabric slices 202-216, as desired. Thus, as examples, there are generally fewer gated buffers in each subsequent gated buffer stage across each cross-point switch fabric slice 202-216, and the gated buffers in each subsequent gated buffer stage may increase in size or otherwise matched to provide increased drive capability.

For the 8×8 cross-point switch fabric 200, the address bus 250 provides, as one example, the following organization of gated buffer stage control signals: 3 control signals are connected to the first gated buffer stages in each cross-point switch fabric slice 202-216, 2 control signals are connected to the second gated buffer stages in each cross-point switch fabric slice 202-216, and 1 control signals are connected to the third gated buffer stage in each cross-point switch fabric slice 202-216.

In the cross-point switch fabric 200, the gated buffers in each first gated buffer stage are grouped into two sets of four, with each set sharing control signals. Thus, two gated buffers in the first gated buffer stage will be active, but only one will be subsequently selected in the second gated buffer stage, and one path from an input to an output of any particular cross-point switch fabric slice will be activated.

Figure 3:
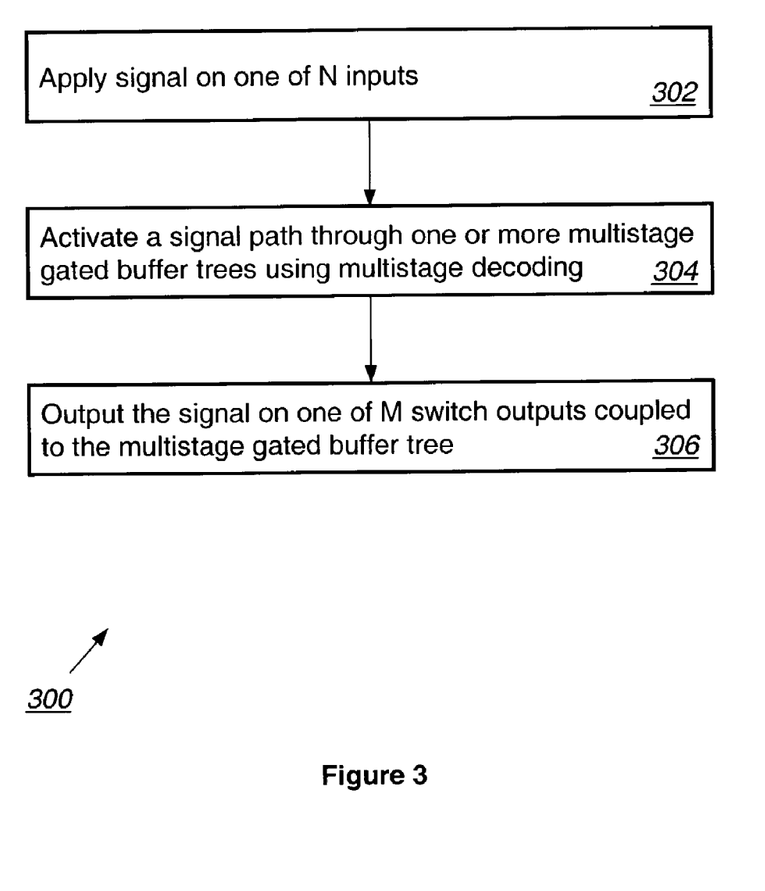
FIG. 3 depicts a method for routing a signal through a cross-point switch fabric.

Turning next to FIG. 3, that figure summarizes a method 300 for routing a signal through a cross-point switch fabric. At step 302, an input signal is applied to a cross-point switch fabric input. Next, at step 304, address decoding logic generates gated buffer stage control signals to activate a signal path through one or more multistage gated buffer trees that form the cross-point switch fabric.

As noted above, the decoding logic may use multistage decoding to activate the signal path. In addition, also as noted above, the gated buffer stage control signals may be shared between substages of a gated buffer stage. At step 306, the input signal is output on one of M switch outputs in accordance with the activated signal path.

Figure 4:
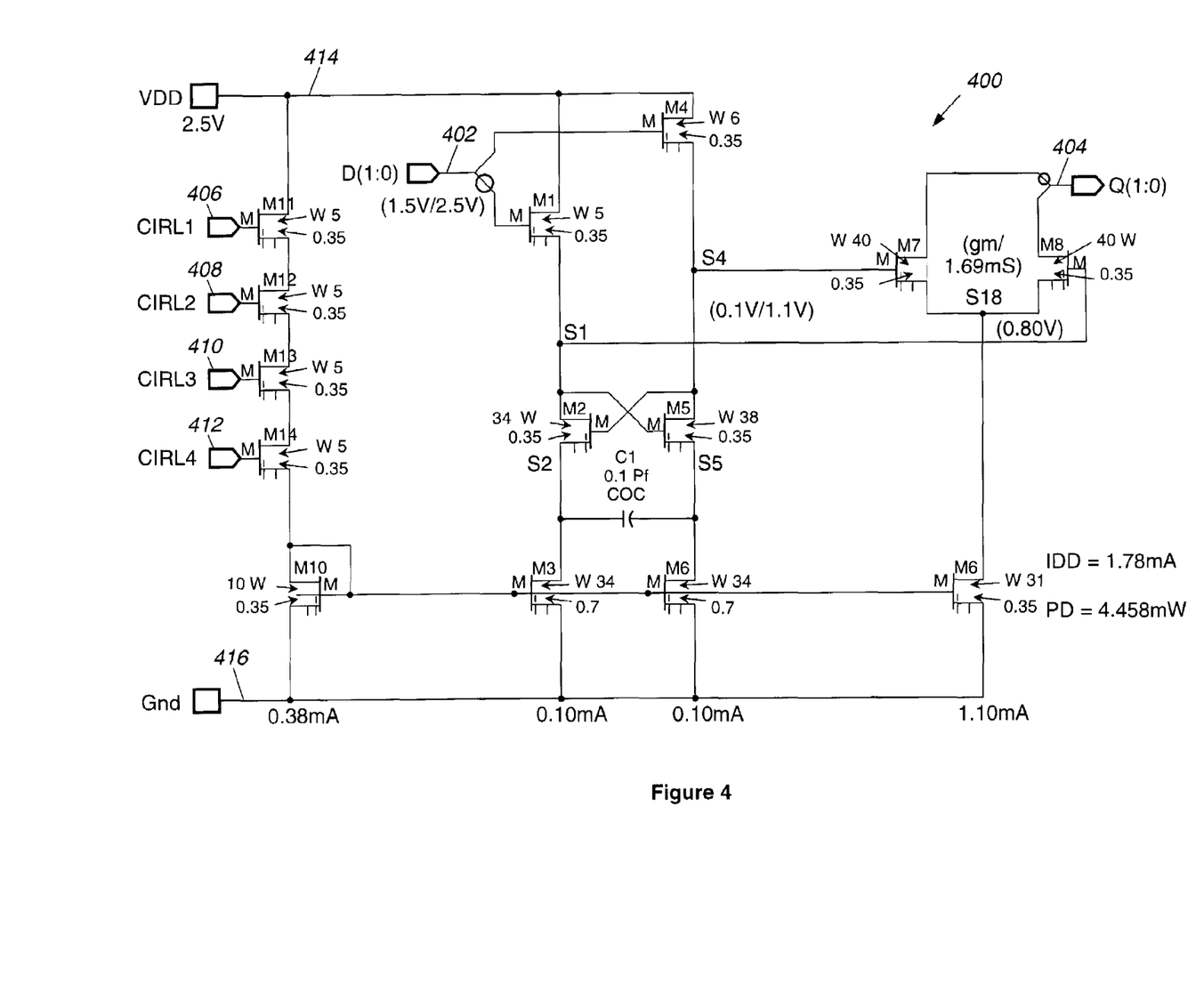
FIG. 4 shows one implementation of a buffer suitable for a first gated buffer stage.

Turning next to FIG. 4, that figure shows one implementation of a gated buffer 400 for use in a first gated buffer stage of a 128×M cross-point switch fabric. The gated buffer 400 includes a differential input 402, a differential output 404, and gated buffer stage control signal inputs ("control inputs") 406, 408, 410, and 412. A power supply connection 414 and a ground connection 416 are also illustrated.

The control inputs 404-410 must all be active in order to activate the gated buffer 400. In other words, when all the control inputs 404-410 are active, the differential input 402 is connected through to the differential output 404.

Table 1, below, presents exemplary physical parameters of the circuit elements in FIG. 4.

TABLE 1

| Width | Length | Transistors |
| --- | --- | --- |
| 5 microns | 0.35 microns | M11, M12, M13, M14 |
| 10 microns | 0.35 microns | M10 |
| 9 microns | 0.35 microns | M1, M4 |
| 36 microns | 0.35 microns | M2, M5 |
| 34 microns | 0.7 microns | M3, M6 |
| 40 microns | 0.35 microns | M7, M8 |
| 31 microns | 0.35 microns | M9 |
| Capacitance | | Capacitor |
| 0.1 pf | | C1 |

Figure 5:
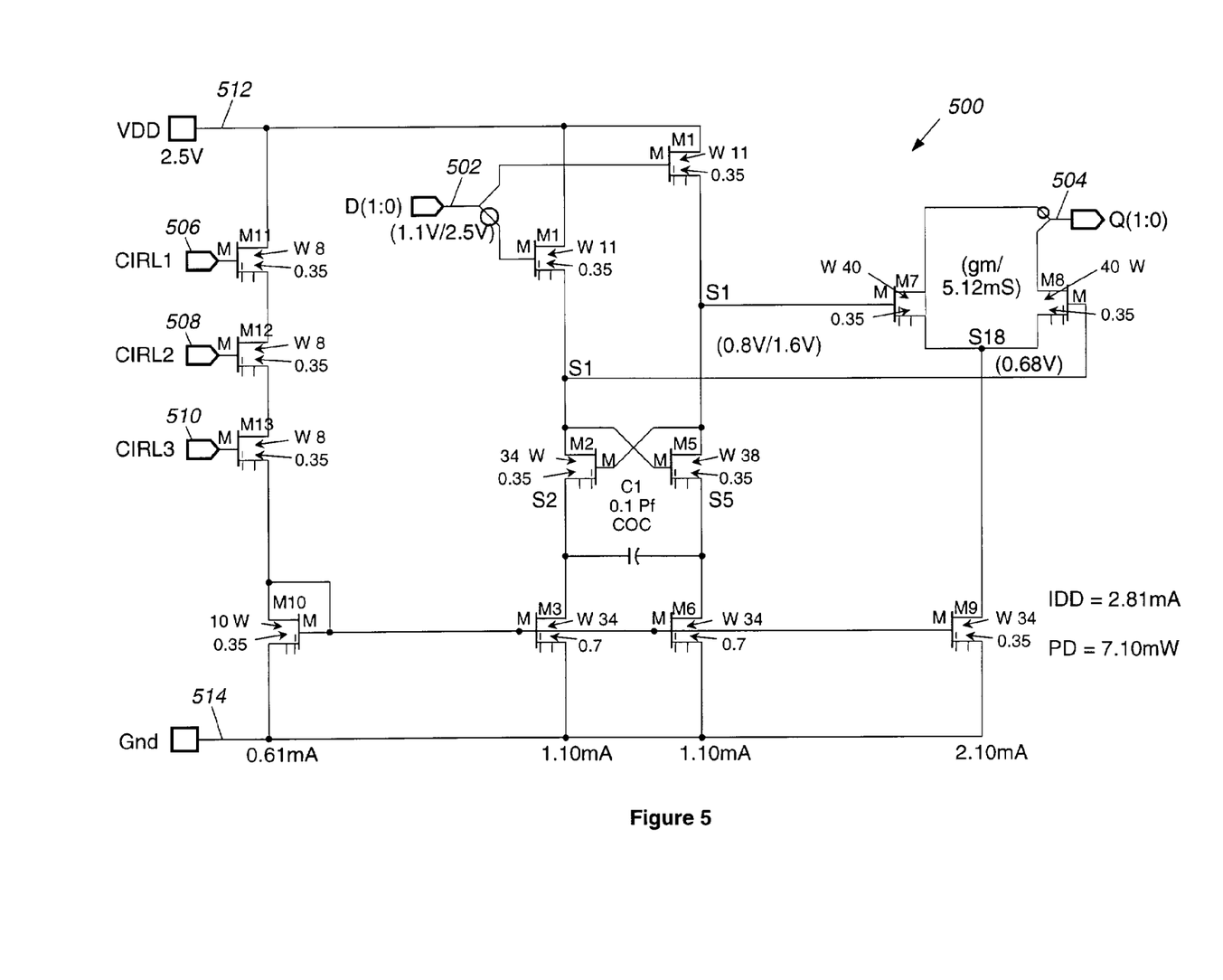
FIG. 5 shows one implementation of a buffer suitable for a second gated buffer stage.

With regard to FIG. 5, that figure shows one implementation of a gated buffer 500 for use in a second gated buffer stage of a 128×M cross-point switch fabric. The gated buffer 500 includes a differential input 502, a differential output 504, and gated buffer stage control signal inputs ("control inputs") 506, 508, and 510. A power supply connection 512 and a ground connection 514 are also illustrated.

The control inputs 506-510 must all be active in order to activate the gated buffer 500. In other words, when all the control inputs 506-510 are active, the differential input 502 is connected through to the differential output 504.

Table 2, below, presents exemplary physical parameters of the circuit elements in FIG. 5.

TABLE 2

| Width | Length | Transistors |
|---|---|---|
| 6 microns | 0.35 microns | M11, M12, M13 |
| 10 microns | 0.35 microns | M10 |
| 11 microns | 0.35 microns | M4, M1 |
| 36 microns | 0.35 microns | M2, M5 |
| 34 microns | 0.7 microns | M3, M6 |
| 34 microns | 0.35 microns | M9 |
| 40 microns | 0.35 microns | M7, M8 |

| Capacitance | Capacitor |
|---|---|
| 0.1 pf | C1 |

Figure 6:
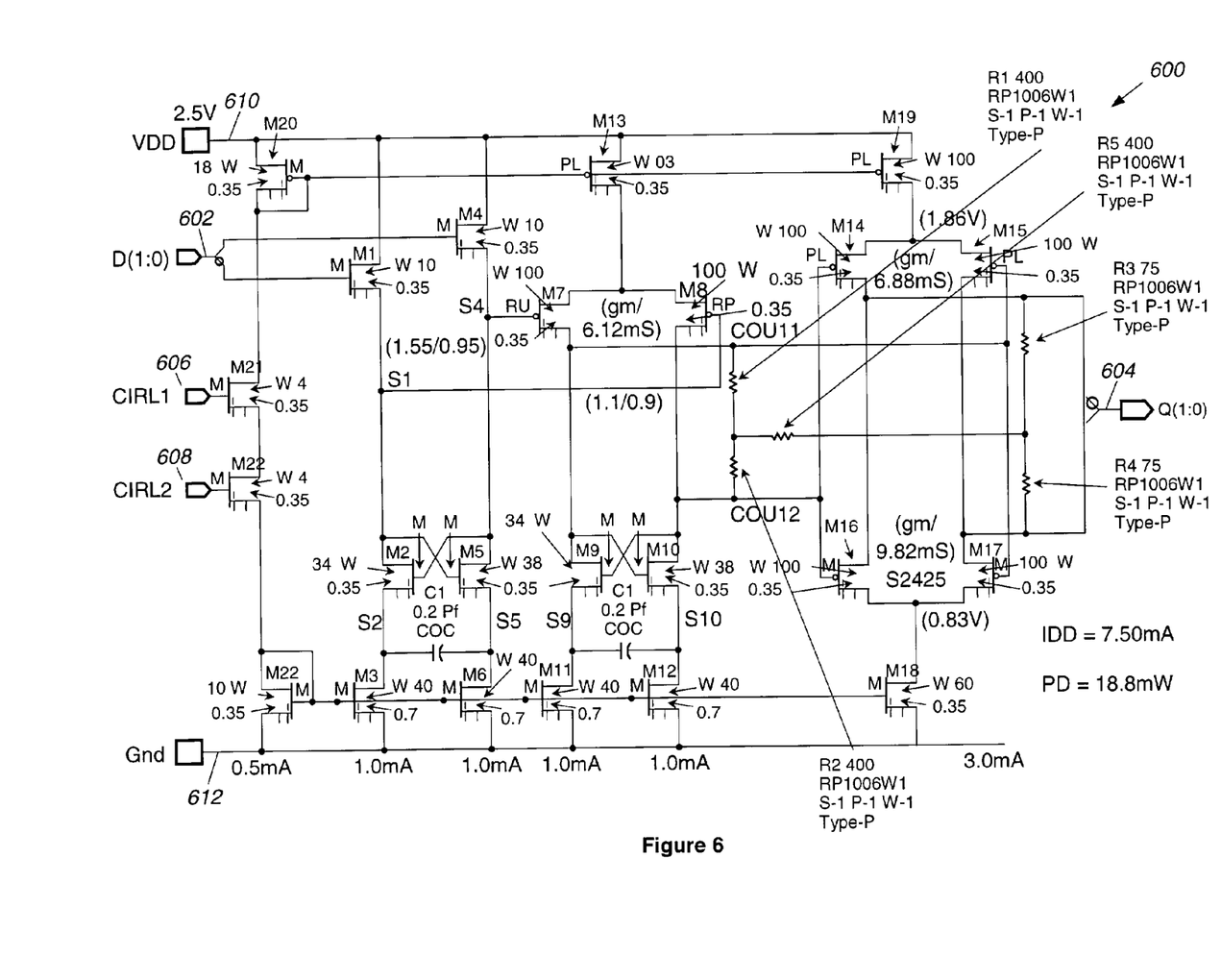
FIG. 6 illustrates one implementation of a buffer suitable for a third gated buffer stage.

FIG. 6 shows one implementation of a gated buffer 600 for use in a third gated buffer stage of a 128×M cross-point switch fabric. The gated buffer 600 includes a differential input 602, a differential output 604, and gated buffer stage control signal inputs ("control inputs") 606 and 608. A power supply connection 610 and a ground connection 612 are also illustrated.

The control inputs 606-608 must all be active in order to activate the gated buffer 600. In other words, when all the control inputs 606-608 are active, the differential input 602 is connected through to the differential output 604.

Table 3, below, presents exemplary physical parameters of the circuit elements in FIG. 6.

TABLE 3

| Width | Length | Transistors |
|---|---|---|
| 15 microns | 0.35 microns | M20 |
| 4 microns | 0.35 microns | M21, M22 |
| 10 microns | 0.35 microns | M1, M4, M23 |
| 36 microns | 0.35 microns | M2, M5, M9, M10 |
| 40 microns | 0.7 microns | M3, M6, M11, M12 |
| 83 microns | 0.35 microns | M13 |
| 100 microns | 0.35 microns | M7, M8, M19, M14, M15, M16, M17 |
| 60 microns | 0.35 microns | M18 |

| Capacitance | Capacitor |
|---|---|
| 0.2 pf | C1, C2 |

| Resistance | Type | Resistor |
|---|---|---|
| 400 | P | R1, R2 |
| 200 | P | R5 |
| 75 | P | R3, R4 |

Figure 7:
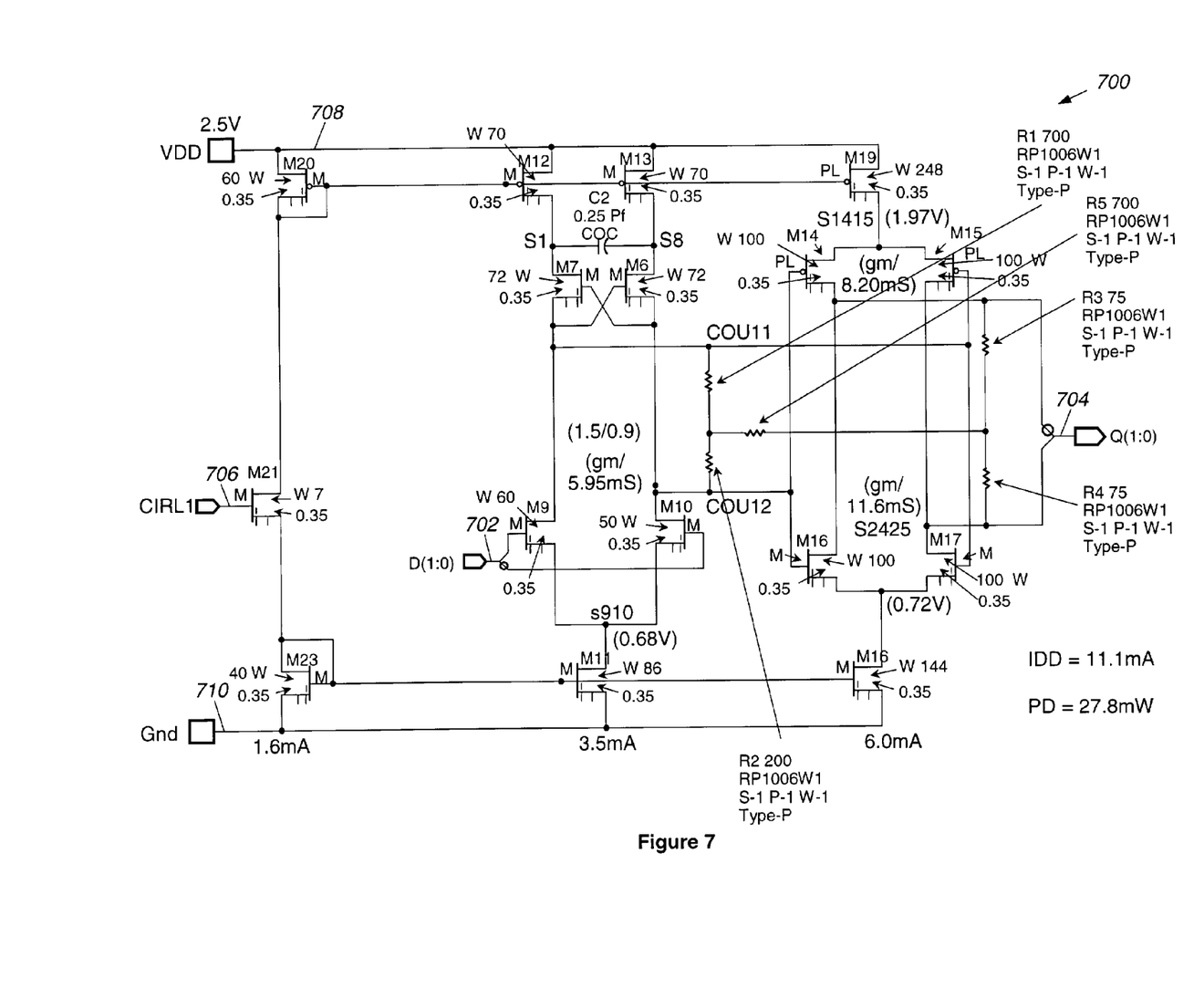
FIG. 7 depicts one implementation of a buffer suitable for a fourth gated buffer stage.

With reference next to FIG. 7, that figure shows one implementation of a gated buffer 700 for use in a fourth gated buffer stage of a 128×M cross-point switch fabric. The gated buffer 700 includes a differential input 702, a differential output 704, and a gated buffer stage control signal input ("control input") 706. A power supply connection 708 and a ground connection 710 are also illustrated.

The control input 706 must be active in order to activate the gated buffer 700. In other words, when the control input 706 is active, the differential input 702 is connected through to the differential output 704.

Table 4, below, presents exemplary physical parameters of the circuit elements in FIG. 7.

TABLE 4

| Width | Length | Transistors |
|---|---|---|
| 60 microns | 0.35 microns | M20 |
| 7 microns | 0.35 microns | M21 |
| 70 microns | 0.35 microns | M12, M13 |
| 72 microns | 0.35 microns | M7, M8 |
| 50 microns | 0.35 microns | M9, M10 |
| 86 microns | 0.35 microns | M11 |
| 248 microns | 0.35 microns | M19 |
| 100 microns | 0.35 microns | M14, M15, M16, M17 |
| 144 microns | 0.35 microns | M18 |

| Capacitance | Capacitor |
|---|---|
| 0.25 pf | C2 |

| Resistance | Type | Resistor |
|---|---|---|
| 200 | P | R1, R2, R5 |
| 75 | P | R3, R4 |

Figure 8:
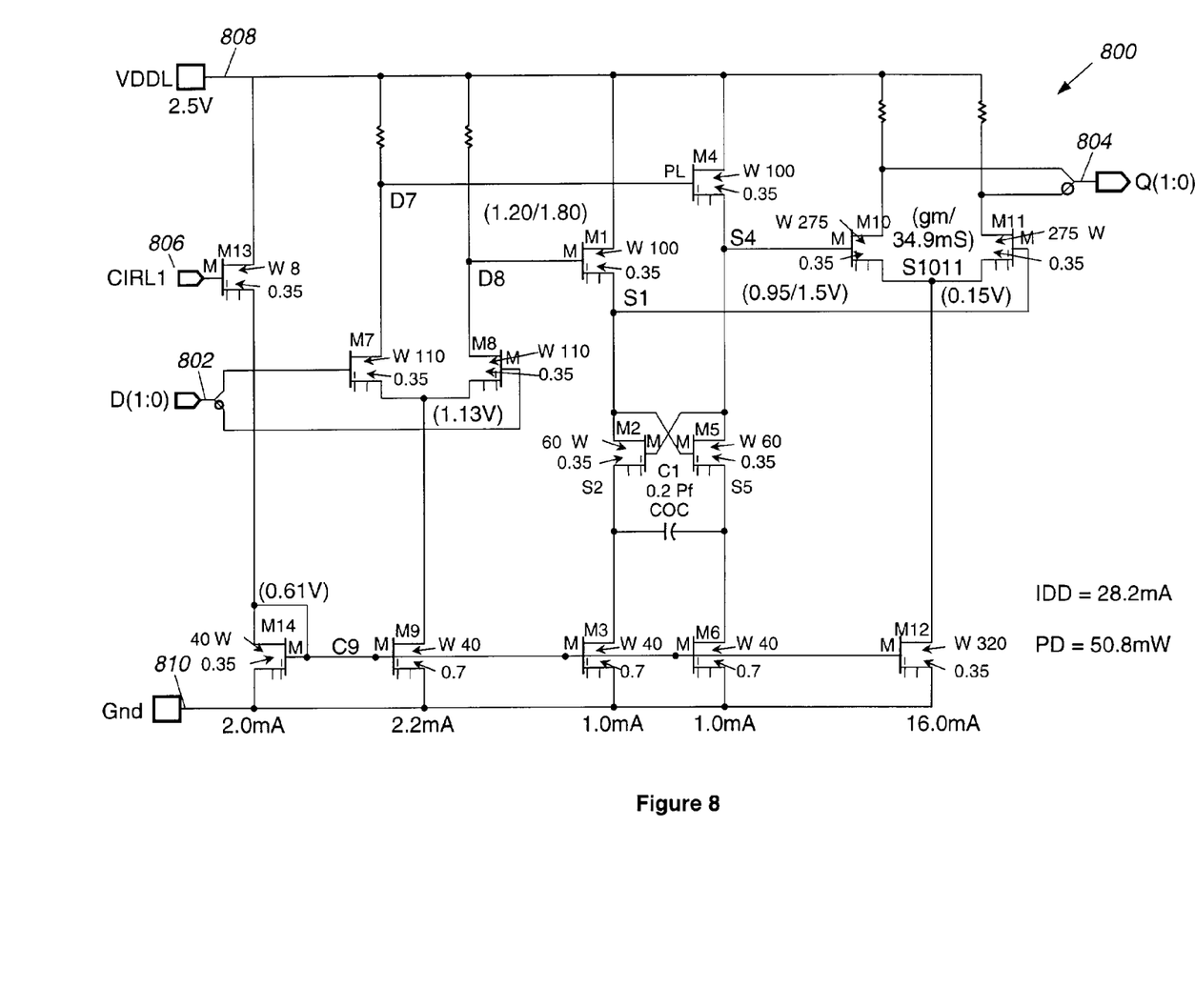
FIG. 8 shows one implementation of an output buffer suitable for a cross-point switch fabric.

With regard to FIG. 8, that figure shows one implementation of an output buffer 800 that may be used to drive a switch output of a cross-point switch fabric. The output buffer 800 includes a differential input 802, a differential output 804, and an output buffer control signal input ("control input") 806. A power supply connection 808 and a ground connection 810 are also illustrated.

The control input 806 must be active in order to activate the output buffer 800. In other words, when the control input 806 is active, the output buffer 800 coverts signal levels present on the differential input 802 to signal levels desired on the differential output 804.

Table 5, below, presents exemplary physical parameters of the circuit elements in FIG. 8.

TABLE 5

| Width | Length | Transistors |
|---|---|---|
| 16 microns | 0.35 microns | M13 |
| 40 microns | 0.35 microns | M9, M14 |
| 110 microns | 0.35 microns | M7, M8 |
| 100 microns | 0.35 microns | M1, M4 |
| 80 microns | 0.35 microns | M2, M5, M3, M6 |
| 275 microns | 0.35 microns | M10, M11 |
| 320 microns | 0.35 microns | M!2 |

| Capacitance | Capacitor |
|---|---|
| 0.2 pf | C1 |

| Resistance | Type | Resistor |
|---|---|---|
| 300 | P | R1, R2 |
| 50 | P | R3, R4 |

As noted above, gated buffer stages may be serially connected together to form large switch fabrics. The gated buffers may be organized into a 128×128 switch fabric, for example, as follows. Four gated buffer stages are used to form 128×1 cross-point switch fabric slices. The switch fabric then is formed from 128 cross-point switch fabric slices.

To form a 128×1 switch fabric slice, the gated buffers 400 form a first gated buffer stage organized as 32 substages of 4 gated buffers 400. Thus, there are a total of 128 gated buffers 400 in each first gated buffer stage. Each substage shares 4 control signals, 3 of which identify 1 of 32 substages and 1 of which identifies 1 of 4 buffer.

The 128×1 switch fabric slice also includes a second gated buffer stage serially connected with the first gated buffer stage. The gated buffers 500 form the second gated buffer stage that is organized as 8 substages of 4 gated buffers 500. Thus, there are a total of 32 gated buffers 500 in each second gated buffer stage. Each substage shares 3 control signals, 2 of which identify 1 of 8 substages and 1 of which identifies 1 of 4 buffers.

A third gated buffer stage is serially connected with the second gated buffer stage. The gated buffers 600 form the third gated buffer stage that is organized as 2 substages of 4 gated buffers 600. Thus, there are a total of 8 gated buffers 600 in each third gated buffer stage. Each substage shares 2 control signals, 1 of which identifies 1 of 2 substages and 1 of which identifies 1 of 4 buffers.

The fourth gated buffer stage is serially connected with the third gated buffer stage. The gated buffers 700 form the fourth gated buffer stage that is organized as 1 substages of 2 gated buffers 700. Thus, there are a total of 2 gated buffers 700 in each second gated buffer stage. Each substage shares 1 control signal, which identifies 1 of 2 buffers.

The output buffer 800 may be used to translate internal signal levels to desired external signal levels for the 128×128 cross-point switch.

In one implementation of multistage decoding, the control signals that activate gated buffer stage 'n' are shared with each previous gated buffer stage 1 . . . (n-1). Thus, for example, as illustrated in FIGS. 4-7, the control signal CTRL1 is shared between the gated buffer 700 for the fourth stage, the gated buffer 600 for the third stage, the gated buffer 500 for the second stage, and the gated buffer 400 for the first stage.

The gated buffer stage control signals may be generated by decoding logic that accepts, for example, a multi-bit control word identifying a desired switch input to switch output connection. The decoding logic outputs the gated buffer stage control signals to activate one of 128 single input to single output connections, single input to multiple output connections, and the like.

The cross-point switch fabric 200 provides differential signaling, gated buffers, distributed input receivers, a multistage gated buffer tree, and a multistage decoding. Differential signaling improves bandwidth because lower voltage swings (and correspondingly lower time constants) may be employed, lowers power (through lower voltages and currents), and greatly improves signal fidelity (by reducing jitter and sensitivity to crosstalk and groundbounce, providing common mode crosstalk rejection, and providing threshold robustness). Gated buffers further improve bandwidth (each buffer may have minimum fanout with power maximized for each buffer), minimize design size, reduce power consumption (since only buffers in the active signal path consume power), and improve signal fidelity (by reducing jitter and sensitivity to crosstalk and groundbounce, and by reducing crosstalk by eliminating internal interference signals).

It is further noted that the gated buffers may be sized and spaced across the cross-point switch fabric to provide distributed input receivers. As a result, a high fanout input buffer may be eliminated thereby resulting in higher bandwidth and reduced size. The distributed input receivers reduce power consumption by eliminating the high fanout input buffer with minimal effect on signal fidelity.

Additionally, the multistage gated buffer tree implementation allows each gated buffer stage to be individually optimized in size, placement, drive capability, and the like to maximize bandwidth, reduce power consumption, and minimize size. Furthermore, the gated buffer tree implementation improves signal fidelity by allowing higher impedance signal nodes to be localized, with minimal crosstalk, while the final output node may have lower impedance and higher crosstalk tolerance.

With multistage decoding, bandwidth is improved, and size is reduced, because the cross-point switch fabric size is minimized, thereby lowering parasitic capacitance. As noted above, higher bandwidth reduces jitter and sensitivity to crosstalk and groundbounce.

While the invention has been described with reference to one or more preferred embodiments, those skilled in the art will understand that changes may be made and equivalents may be substituted without departing from the scope of the invention. In addition, many modifications may be made to adapt a particular step, structure, or material to the teachings of the invention without departing from its scope. Therefore, it is intended that the invention not be limited to the particular embodiment disclosed, but that the invention will include all embodiments falling within the scope of the appended claims.

The invention claimed is:

1. A cross-point switch fabric slice comprising:
   a multistage gated buffer tree comprising at least first and second serially connected gated buffer stages; and
   N inputs coupled to preselected gated buffers in the first gated buffer stage,
   wherein the preselected gated buffers include control inputs for receiving gated buffer stage control signals, and
   wherein the multistage gated buffer tree provides a signal path from any of the N inputs to at least one switch output in response to the gated buffer stage control signals.

2. The cross-point switch fabric slice of claim 1, wherein each of the N inputs comprises a differential input.

3. The cross-point switch fabric slice of claim 1, wherein the multistage gated buffer tree comprises at least first, second, and third serially connected gated buffer stages.

4. The cross-point switch fabric slice of claim 3, wherein preselected gated buffers of the second and third gated buffer stages include control inputs for receiving the gated buffer stage control signals, wherein the multistage gated buffer tree provides a signal path from any of the N inputs to the third gated buffer stage switch output in response to the gated buffer stage control signals.

5. The cross-point switch fabric slice of claim 3, wherein the multistage gated buffer tree is an N-to-1 multistage gated buffer tree.

6. The cross-point switch fabric slice of claim 1, wherein the multistage gated buffer tree is an N-to-1 multistage gated buffer tree.

7. The cross-point switch fabric slice of claim 1, wherein the gated buffers in the second gated buffer stage are characterized by greater drive capability than the gated buffers in the first gated buffer stage.

8. The cross-point switch fabric slice of claim 1, wherein each of the preselected gated buffers in the first gated buffer stage includes a differential input, a differential output, and a predetermined number of gated buffer stage control signal inputs.

9. The cross-point switch fabric slice of claim 8, wherein the differential input is connected through to the differential output when all the predetermined number of gated buffer stage control signal inputs are active.

10. The cross-point switch fabric slice of claim 1, wherein each of preselected gated buffers in the second gated buffer stage includes a differential input, a differential output, and a predetermined number of gated buffer stage control signal inputs.

11. The cross-point switch fabric slice of claim 10, wherein the differential input is connected through to the differential output when all the predetermined number of gated buffer stage control signal inputs are active.

12. A cross-point switch fabric slice comprising:
a multistage gated buffer tree comprising at least first, second and third serially connected gated buffer stages, wherein the gated buffers in the second gated buffer stage are characterized by greater drive capability than the gated buffers in the first gated buffer stage, and wherein the gated buffers in the third gated buffer stage are characterized by greater drive capability than the gated buffers in the second gated buffer stage; and
N inputs coupled to preselected gated buffers in the first gated buffer stage,
wherein the gated buffers of the first, second and third gated buffer stages include control inputs for receiving gated buffer stage control signals, and
wherein the multistage gated buffer tree provides a signal path from any of the N inputs to at least one switch output in response to the gated buffer stage control signals.

13. The cross-point switch fabric slice of claim 12, wherein the gated buffers in the first, second and third gated buffer stages include a differential input, a differential output, and a predetermined number of gated buffer stage control signal inputs.

14. A cross-point switch fabric slice comprising:
a multistage gated buffer tree comprising at least first and second serially connected gated buffer stages; and
N inputs coupled to preselected gated buffers in the first gated buffer stage,
wherein the preselected gated buffers include control inputs for receiving gated buffer stage control signals,
wherein the multistage gated buffer tree provides a signal path from any of the N inputs to at least one switch output in response to the gated buffer stage control signals; and
wherein the first gated buffer stage is partitioned into a first substage and a second substage, and wherein at least one of the gated buffer stage control signals is shared between the first substage and the second substage.

15. The cross-point switch fabric slice of claim 14, wherein a first gated buffer stage control signal activates a first gated buffer in the first substage, and wherein the first gated buffer stage control signal activates a corresponding gated buffer in the second substage.

16. A cross-point switch fabric comprising:
N inputs;
a first cross-point switch fabric slice comprising:
a first multistage gated buffer tree coupled to the N inputs and comprising a first gated buffer stage coupled to the N inputs and a second gated buffer stage serially connected with the first gated buffer stage;
wherein the first multistage gated buffer tree provides a signal path from any of the N inputs to a first switch output in response to first gated buffer stage control signals; and
a second cross-point switch fabric slice comprising:
a second multistage gated buffer tree coupled to the N inputs and comprising a third gated buffer stage coupled to the N inputs and a fourth gated buffer stage serially connected with the third gated buffer stage;
wherein the second multistage gated buffer tree provides a signal path from any of the N inputs to a second switch output in response to second gated buffer stage control signals.

17. The cross-point switch fabric of claim 16, further comprising at least one additional multistage gated buffer tree cross-point switch fabric slice coupled to the N inputs, and at least one additional switch output.

18. The cross-point switch fabric of claim 16, wherein gated buffers in the second gated buffer stage are characterized by greater drive capability than gated buffers in the first gated buffer stage.

19. The cross-point switch fabric of claim 16, wherein the second gated buffer stage comprises fewer gated buffers than the first gated buffer stage.

20. The cross-point switch fabric of claim 16, wherein the gated buffers in the fourth gated buffer stage are characterized by greater drive capability than the gated buffers in the third gated buffer stage.

21. The cross-point switch fabric of claim 16, wherein the fourth gated buffer stage comprises fewer gated buffers than the third gated buffer stage.

22. A cross-point switch fabric comprising:
N inputs;
a first cross-point switch fabric slice comprising:
a first multistage gated buffer tree coupled to the N inputs and comprising a first gated buffer stage coupled to the N inputs and a second gated buffer stage serially connected with the first gated buffer stage;
wherein the first multistage gated buffer tree provides a signal path from any of the N inputs to a first switch output in response to first gated buffer stage control signals; and
a second cross-point switch fabric slice comprising:
a second multistage gated buffer tree coupled to the N inputs and comprising a third gated buffer stage coupled to the N inputs and a fourth gated buffer stage serially connected with the third gated buffer stage;
wherein the second multistage gated buffer tree provides a signal path from any of the N inputs to a second switch output in response to second gated buffer stage control signals; and
wherein at least one of the first and second multistage gated buffer trees comprises an additional gated buffer stage serially connected with one of the second gated buffer stages.

23. The cross-point switch fabric of claim 22, wherein the gated buffers in the additional gated buffer stage are characterized by greater drive capability than the serially connected gated buffers in the second gated buffer stage.

24. The cross-point switch fabric of claim 22, wherein the gated buffers in the additional gated buffer stage are fewer in number than the serially connected gated buffers in the second gated buffer stage.

25. The cross-point switch fabric of claim 16, configured as an N×N switch further comprising at least one additional multistage gated buffer tree cross-point switch fabric slice coupled to the N inputs, and at least one additional switch output.

26. The cross-point switch fabric of claim 16, wherein at least one of the first and third gated buffer stages is partitioned into a first substage and a second substage, and wherein gated buffer stage control signals are shared between the first substage and the second substage.

27. The cross-point switch fabric of claim 26, wherein a first gated buffer stage control signal activates a first gated buffer in the first substage, and wherein the first gated buffer stage control signal activates a corresponding gated buffer in the second substage.

28. A method for routing a signal through a cross-point switch fabric, the method comprising:
applying a signal on one of N inputs;
activating a signal path through a first multistage gated buffer tree comprising at least first and second serially connected gated buffer stages, wherein the activating of the signal path includes multistage decoding, wherein the multistage decoding includes applying a first gated buffer stage control signal to control inputs of corresponding gated buffers in both a first and a second substage of the first gated buffer stage; and
outputting the signal on a switch output coupled to the multistage gated buffer tree.

29. The method of claim 28, wherein activating further comprises activating a signal path through one of a plurality of multistage gated buffer trees.

30. The method of claim 29, wherein outputting comprises outputting the signal on one of M switch outputs provided by the plurality of multistage gated buffer trees.

31. The method of claim 30, wherein N=M.

32. The method of claim 28, further comprising providing increased drive capability in the second gated buffer stage over the first gated buffer stage.

33. A method for routing a signal through a cross-point switch fabric, the method comprising:
applying a signal on one of N inputs;
activating a signal path through a first multistage gated buffer tree comprising at least first and second serially connected gated buffer stages; and
outputting the signal on a switch output coupled to the multistage gated buffer tree,
wherein activating comprises multistage decoding,
wherein multistage decoding comprises activating, using a first gated buffer stage control signal, corresponding gated buffers in both a first and a second substage of the first gated buffer stage, and
wherein multistage decoding further comprises activating, using a second gated buffer stage control signal, a gated buffer in the second gated buffer stage to select one activated gated buffer in the first gated buffer stage.

* * * * *